(12) United States Patent  (10) Patent No.: US 7,583,672 B2
Yang et al.  (45) Date of Patent: Sep. 1, 2009

(54) TECHNIQUES TO SUPPORT ASYMMETRICAL STATIC/DYNAMIC ADJACENCY IN ROUTERS

(75) Inventors: Yi Yang, Morrisville, NC (US); Thuan Van Tran, Cary, NC (US); Donnie Van Savage, Raleigh, NC (US); Donald Slice, Cary, NC (US); James Ng, Mebane, NC (US); Alvaro Retana, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 544 days.

(21) Appl. No.: 11/398,825

(22) Filed: Apr. 5, 2006

(65) Prior Publication Data

US 2007/0237142 A1  Oct. 11, 2007

(51) Int. Cl.
 *H04L 12/28* (2006.01)
(52) U.S. Cl. ........................ 370/392; 370/432
(58) Field of Classification Search ........... None
 See application file for complete search history.

(56) References Cited

U.S. PATENT DOCUMENTS

| | | | |
|---|---|---|---|
| 6,463,061 B1 | 10/2002 | Rekhter et al. | |
| 6,526,056 B1 | 2/2003 | Rekhter et al. | |
| 7,023,808 B2 | 4/2006 | Ball et al. | |
| 2003/0016672 A1 | 1/2003 | Rosen et al. | |
| 2004/0039839 A1 | 2/2004 | Kalyanaraman et al. | |
| 2004/0258002 A1 | 12/2004 | Tran et al. | |
| 2004/0260834 A1 | 12/2004 | Lindholm et al. | |
| 2005/0074003 A1 | 4/2005 | Ball et al. | |
| 2005/0076114 A1 | 4/2005 | Cook | |
| 2005/0135256 A1 | 6/2005 | Ball et al. | |
| 2005/0177634 A1 | 8/2005 | Scudder et al. | |

*Primary Examiner*—Bob A Phunkulh
(74) *Attorney, Agent, or Firm*—Brian N. Young; Trellis IP Law Group, PC

(57) ABSTRACT

A static neighbor configured network device is configured with a static neighbor feature including a static neighbor list of network devices. The static neighbor configured network device is in a network segment that includes a dynamically configured network device. The static neighbor configured network device receives a multicast packet from the dynamically configured network device. It is determined if the dynamically configured network device is included in the static neighbor list of the static neighbor configured network device. The multicast packet is accepted if the dynamically configured network device is found in the neighbor list for the static neighbor configured network device. Also, adjacency for the static neighbor configured network device is not lost with any other currently adjacent network devices when the multicast packet is received.

22 Claims, 4 Drawing Sheets

TECHNIQUES TO SUPPORT ASYMMETRICAL STATIC/DYNAMIC ADJACENCY IN ROUTERS

BACKGROUND OF THE INVENTION

Embodiments of the present invention generally relate to routing technologies and more specifically to techniques for supporting asymmetrical adjacency in routers.

In a network, routers form adjacency with peers. Adjacency is formed by exchanging routing information between routers. This forms a two-way relationship in which routers can communicate. Adjacency is typically formed between routers that are considered neighbors, which are routers with interfaces to a common network. Protocols, such as Enhanced Interior Gateway Routing Protocol (EIGRP) define requirements for adjacency. For example, if a router is configured with a static neighbor feature, a static neighbor list defines which routers the router can be adjacent with.

In certain network configurations, such as a hub-and-spoke configuration, a large list of static neighbors is required on the hub because the number of spoke routers may be large, such as in the thousands. This list is manually entered and is hard to maintain.

When a router is configured with the static neighbor feature, all routers that communicate with it should be configured with the same feature. Routers configured with the static neighbor feature are required to send packets using unicast. Thus, a hub router is configured with the static neighbor feature and required to use unicast to communicate with other routers. This may require the hub to send many unicast messages to form adjacency with all the spoke routers.

Also, a router configured with a static neighbor feature is configured to only accept unicast messages because it is expected that all neighbors send messages using unicast. This makes routers configured with the static neighbor feature vulnerable to attacks. For example, an attacker may generate a fake multicast packet that pretends to originate from a router in the network. A router configured with the static neighbor feature considers multicast routers as an incompatible neighbor-type. Thus, adjacency with all other routers may be brought down for the router in this case.

DETAILED DESCRIPTION OF EMBODIMENTS OF THE INVENTION

Embodiments of the present invention generally relate to supporting asymmetrical adjacency between peers on a network. Neighbor discovery/recovery is the process that routers use to dynamically learn of other routers on their directly attached networks. Neighbor discovery/recovery is achieved by periodically sending small hello packets. Once the hello packets are received, the neighboring routers can exchange routing information to form adjacency. Adjacency allows a router to know which other routers are attached to the network and the exchanged routing information is used to exchange packets between routers.

In one embodiment, a router may be configured with a static neighbor feature. A router configured with the static neighbor feature may be referred to as a "static neighbor configured router" or "SNCR". The static neighbor feature configures a router with a static neighbor list that specifies which routers the static neighbor configured router can form adjacency with. A router not configured with the static neighbor feature can form adjacency with any routers, whether or not they are configured with the static neighbor feature or not. A router not configured with the static neighbor feature will be referred to as a "dynamically configured router" or "DCR".

Adjacency between DCRs and SNCRs is allowed. The DCR may use multicast to form adjacency with multiple SNCRs. The SNCRs can accept both multicast and unicast packets from routers on their static neighbor list after adjacency if formed. Also, a SNCR may not reset adjacency when it receives a multicast packet from a neighbor.

Figure 1:
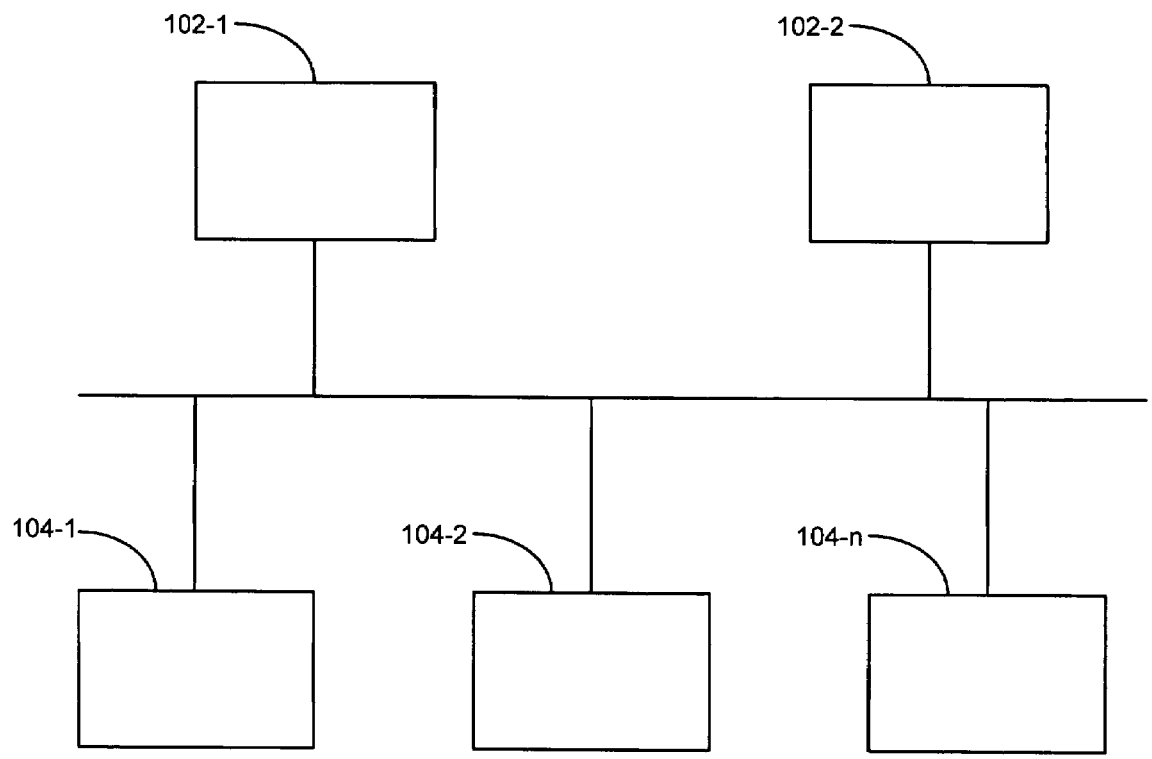
FIG. 1 depicts a network segment according to one embodiment of the present invention.

FIG. 1 depicts a network segment 100 according to one embodiment of the present invention. Network segment 100 may be any shared media or multi-access media. Routers communicate with other routers using an interface. The static neighbor feature may be configured for the interface. A router may have multiple interfaces that are configured differently. However, when a router configured with a static neighbor feature is referenced, it is assumed that the static neighbor feature has been configured for an interface. It will be recognized that the router may have other interfaces, such as an interface that is not configured with the static neighbor feature. However, for discussion purposes, a SNCR is a router that has an interface configured with the static neighbor feature but it is not limited to having other interfaces that are configured differently.

Routers in segment 100 may be configured as static neighbor configured routers and/or dynamically configured routers. As shown, routers 102-1 and 102-2 are dynamically configured routers, and routers 104-1-104-n are static neighbor configured routers.

System 100 shows a hub and spoke configuration including routers 102-1 and 102-2. Although the following description describes a hub and spoke configuration, it will be understood that other configurations may be appreciated, such as stub configurations, etc. In one embodiment, routers 102-1 and 102-2 are hub routers. Routers 104-1-104-n may be considered spoke routers.

Embodiments of the present invention support asymmetrical adjacency between a SNCR and a DCR. Adjacency can be formed between SNCRs 104 and DCRs 102. Also, communications between them are allowed after adjacency if formed.

SNCRs 104 are configured with a static neighbor list. However, the static neighbor list may not be as long as a conventional hub static neighbor list if this is a hub and spoke configuration because spoke routers may only be adjacent with hub routers in some network configurations. Thus, a spoke router SNCR 104-1 may be adjacent with DCRs 102-1 and 102-2 and not with any of SNCRs 104-2 or 104-n.

DCRs 102 may use unicast and/or multicast to send packets to other routers. For example, DCR 102 may send a hello packet using multicast. The hello packet includes routing information that is needed to form adjacency between routers. Also, communications after adjacency is formed may be sent using multicast. In one embodiment, multicast is more efficient than unicast in that a multicast packet may be sent that is then propagated to multiple routers. For example, a single packet may be sent that is routed to multiple routers in system 100. Thus, multicast may be an efficient use of delivering routing information to other routers.

When a multicast packet is received at SNCR 104, adjacency is not reset due to a multicast packet being received. Rather, SNCR 104 is configured to determine if the router that sent the multicast packet is on its static neighbor list. If so, the packet may be accepted. If not, the multicast packet is rejected; however, adjacency is not reset. SNCR 104 can also receive unicast packets in addition to multicast packets.

SNCR 104 is configured to send unicast and/or multicast packets. For example, when a multicast packet is received from DCR 104 to form adjacency, SNCR 104 may send a unicast packet back to DCR 102. In this case, neighbor adjacency may be formed between SNCR 104 and DCR 102

Figure 2:
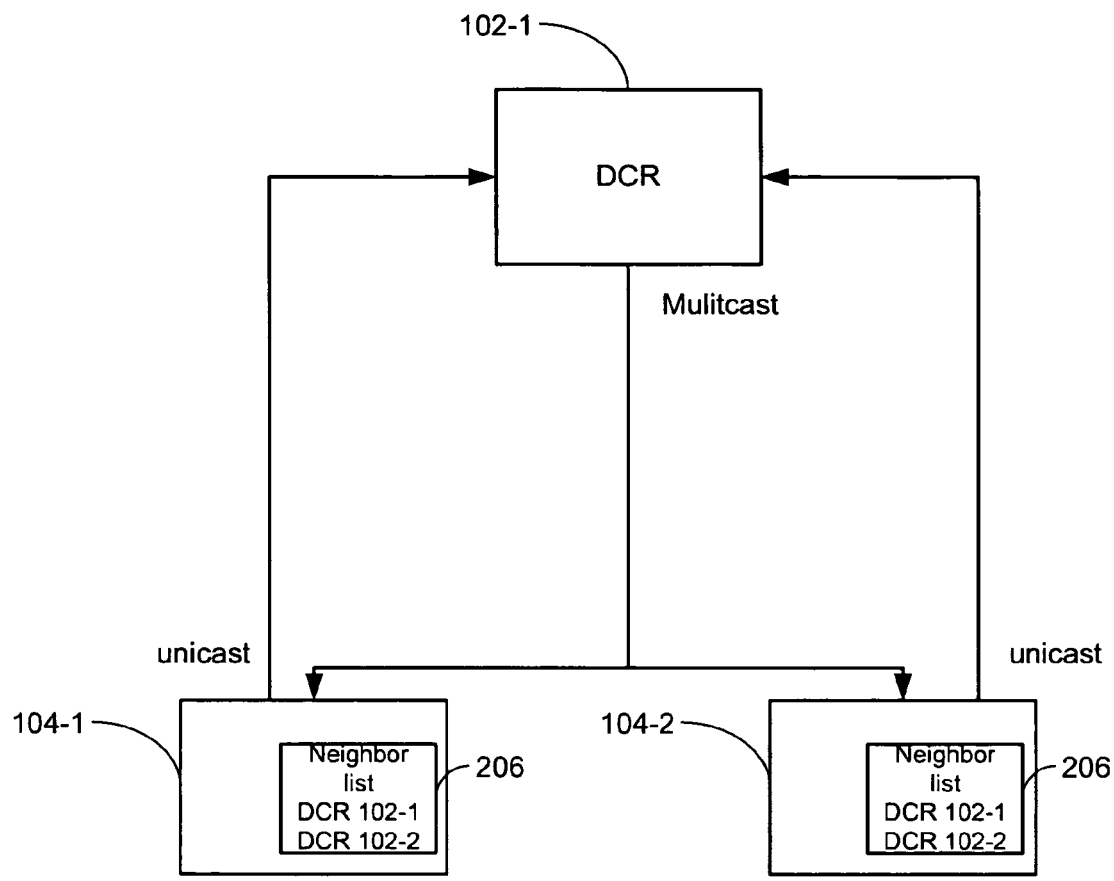
FIG. 2 depicts a more detailed embodiment of the network segment according to one embodiment of the present invention.

FIG. 2 depicts a more detailed embodiment of system 100 according to one embodiment of the present invention. As shown, DCR 102-1 communicates with two SNCRs 104-1 and 104-2. In one embodiment, DCR 102-1 is able to send multicast and/or unicast packets.

SNCRs 104-1 and 104-2 are configured with static neighbor list 206. SNCRs 104-1 and 104-2 can only form adjacencies and accept communications with routers on list 206. As shown, DCR 102-1 and DCR 102-2 are included on list 206. Thus, adjacency may be formed with DCR 102-1 and communications can be accepted from DCR 102-1 using multicast and/or unicast. Static neighbor list 206 may include IP addresses or other identifiers that can be used to determine if a packet is received from a router on list 206.

In one example, DCR 102-1 may send a multicast packet to both SNCRs 104-1 and 104-2. This multicast packet is accepted by SNCRs 104-1 and 104-2 even though they are configured with the static neighbor feature.

If the multicast packet is a hello packet, adjacency may be formed between SNCR 104-1 and DCR 102-1 and between SNCR 104-2 and DCR 102-1 because DCR 102-1 is on static neighbor list 206 of SNCRs 104-1 and 104-2. If DCR 102-1 is not on neighbor list 206, the multicast packet may be rejected. However, adjacency with other routers may not be brought down by receiving the multicast packet.

SNCRs 104-1 and 104-2 may then send a unicast packet to DCR 102-1 to form adjacency. When DCR 102-1 receives the unicast packet, adjacency may be formed.

After adjacency is formed, DCR 102-1 may send multicast packets to SNCR 104-1 and/or SNCR 104-2. These multicast packets are accepted as long as DCR 102-1 remains on static neighbor list 206.

Figure 3:
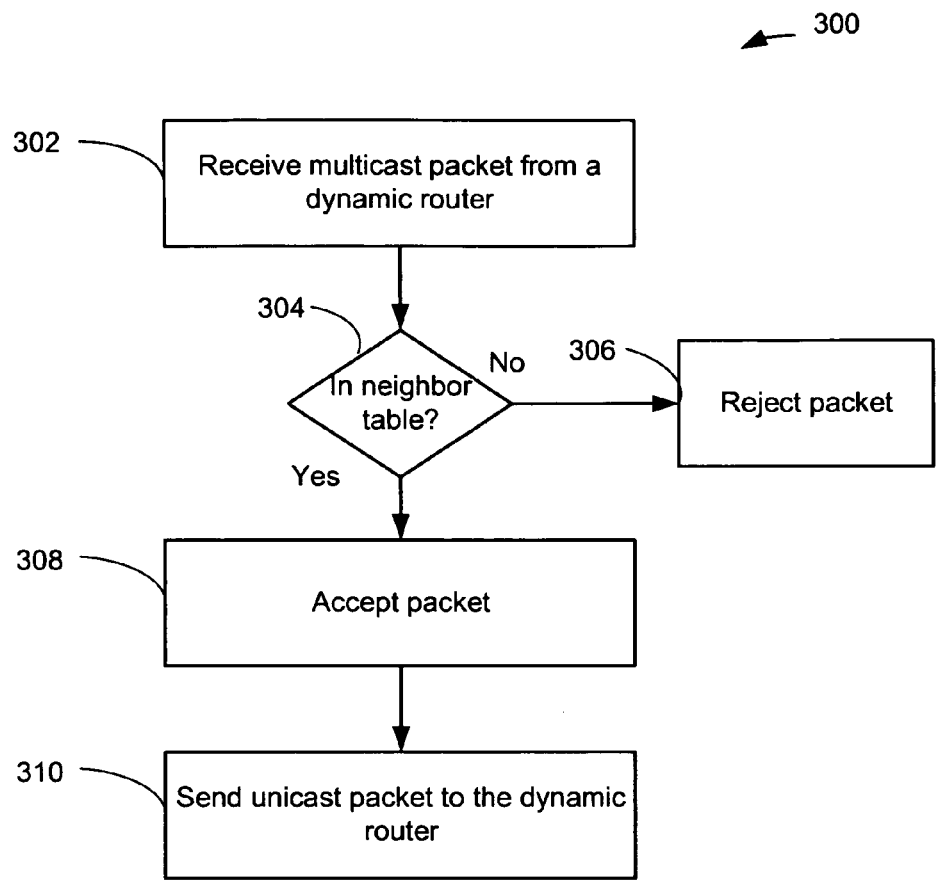
FIG. 3 depicts a simplified flow chart of a method for forming adjacency according to one embodiment of the present invention.

FIG. 3 depicts a simplified flow chart 300 of a method for accepting communications from a DCR 102-1 according to one embodiment of the present invention. In step 302, a SNCR 104-1 receives a multicast packet from DCR 102-1.

In step 304, SNCR 104-1 determines if DCR 102-1 is in its static neighbor list 206. In step 306, SNCR 104-1 rejects the multicast packet if DCR 102-1 is not in static neighbor list 206. However, adjacency with other routers is not brought down for SNCR 104-1.

If DCR 102-1 is in the static neighbor list 206, in step 308, SNCR 104-1 accepts the packet. The packet may be a hello packet that includes routing information from DCR 102-1. The routing information may then be stored. Also, the packet may be a communication for SNCR 104-1 that is accepted.

In step 310, SNCR 104-1 then sends a unicast packet to DCR 102-1. The packet may include routing information for SNCR 104-1 and may be used to form adjacency with DCR 102-1. Accordingly, adjacency is formed between a dynamically configured router and a static neighbor configured router. The dynamically configured router may use multicast and the static neighbor configured router may use unicast to form adjacency.

Figure 4:
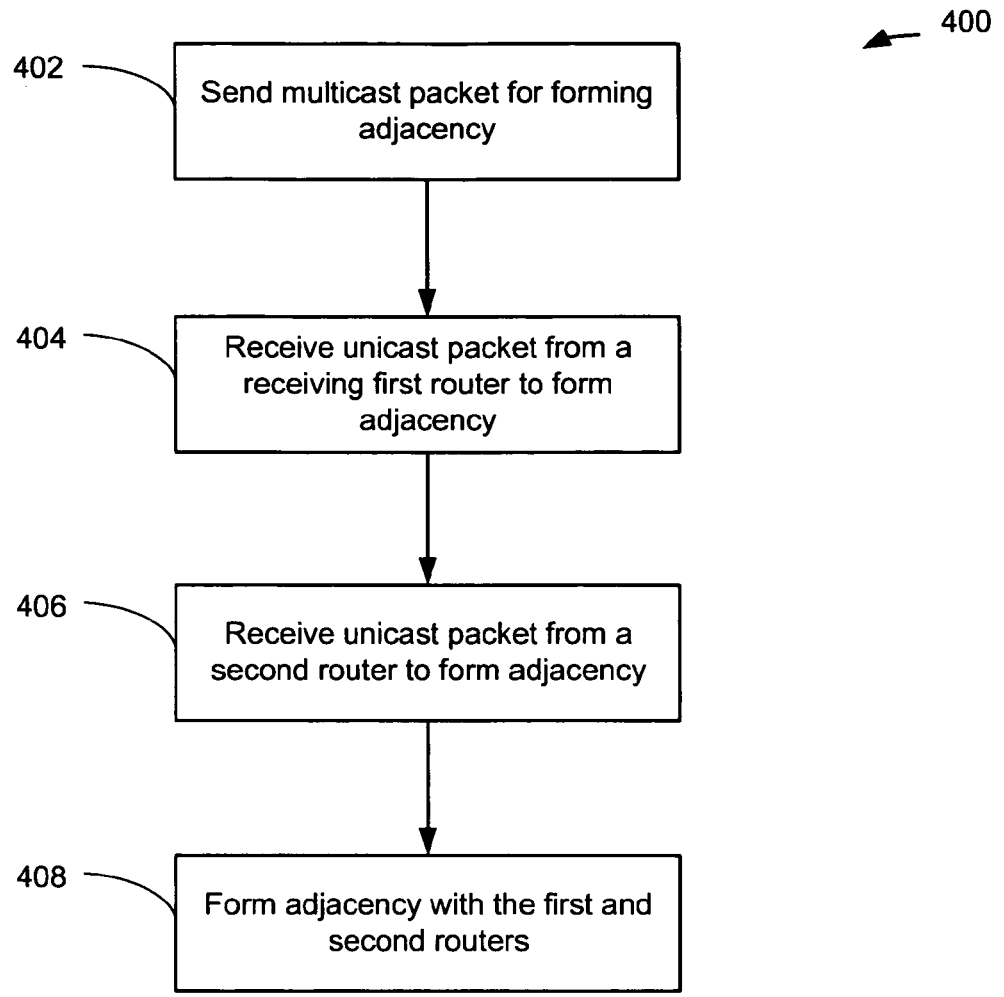
FIG. 4 depicts a simplified flow chart of a method for forming adjacency for a dynamically configured router according to one embodiment of the present invention.

FIG. 4 depicts a simplified flow chart 400 for forming adjacency for a dynamic router according to one embodiment of the present invention. In step 402, a DCR 102-1 sends a multicast packet on a network segment for forming adjacency. For example, a hello packet including routing information for DCR 102-1 may be sent using multicast.

In step 404, DCR 102-1 receives a unicast packet from a receiving SNCR 104-1 to form adjacency. Accordingly, one of the receiving routers has received a multicast packet and wants to form adjacency with DCR 102-1. For example, the received unicast packet may include routing information from SNCR 104-1.

In step 406, DCR 102-1 receives a unicast packet from a receiving SNCR 104-2 to form adjacency. Accordingly, a second one of the receiving routers has received a multicast packet and wants to form adjacency with DCR 102-1.

In step 408, DCR 102-1 then forms adjacency with SNCR 104-1 and 104-2. Accordingly, multicast is used in order to form adjacencies with multiple routers. In one embodiment, this is an efficient way to form adjacency with each possible neighbor.

Embodiments of the present invention provide many advantages. For example, configuration flexibility is provided. Routers may be configured as dynamically configured routers or static neighbor configured routers in a network segment. These dynamically configured router and static neighbor configured routers may form adjacency with each other and also communicate after forming adjacency. Also, network scalability is improved because there is no restriction that all routers be configured with the static neighbor feature if one router is configured with a static neighbor feature in a network segment.

Further, network security is enhanced because adjacency may not be brought down if a multicast packet is received at a router configured with a static neighbor list. Thus, a person, process, etc. cannot bring down adjacency by simply sending a multicast packet to a static neighbor configured router.

Although the invention has been described with respect to specific embodiments thereof, these embodiments are merely illustrative, and not restrictive of the invention. For example, although the above process of forming adjacency is described, it will be understood that variations may be appreciated. For example, a static router may send a hello packet to a dynamic router to form adjacency. The dynamic router may respond by sending a multicast and/or unicast packet in response. Also, it will be recognized that static and/or dynamic routers may send both unicast and multicast packets. Further, routers may be any network devices, such as switches or any other device that route packets (or any data). Although packets are described, it will be recognized that packets can be any information that is sent.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A static neighbor configured network device configured with a static neighbor feature, wherein the static neighbor configured network device comprises one or more processors and a memory containing instructions that, when executed by the one or more processors, cause the one or more processors to perform a set of steps comprising:

receiving a multicast packet from a dynamically configured network device in a network segment with the static neighbor configured network device;

determining if the dynamically configured network device is included in the static neighbor list of the static neighbor configured network device;

accepting the multicast packet if the dynamically configured network device is found in the neighbor list for the static neighbor configured network device, wherein adjacency for the static neighbor configured network device is not lost with any other currently adjacent network devices when the multicast packet is received; and rejecting the multicast packet from the dynamically configured network device if the dynamically configured network device is not on the static neighbor list for the static neighbor configured network device, wherein adjacency for the static neighbor configured network device is not lost with any other currently adjacent network devices when the multicast packet is rejected.

2. The static neighbor configured network device of claim 1, wherein the multicast packet includes a request for forming adjacency between the dynamically configured network device and the static neighbor configured network device.

3. The static neighbor configured network device of claim 2, further comprising sending a unicast response packet to the dynamically configured network device to form adjacency with the dynamically configured network device.

4. The static neighbor configured network device of claim 3, wherein the multicast packet comprises first routing information for the dynamically configured network device and the unicast packet comprises second routing information for the static neighbor configured network device, further comprising forming adjacency using the exchanged first routing information and the second routing information.

5. The static neighbor configured network device of claim 1, further comprising receiving the multicast packet after forming adjacency between the dynamically configured network device and the static neighbor configured network device.

6. The static neighbor configured network device of claim 1, wherein the dynamically configured network device and the static neighbor configured network device are part of a hub and spoke network configuration or a stub network configuration.

7. The static neighbor configured network device of claim 1, further comprising:

receiving a unicast packet from the dynamically configured network device;

determining if the dynamically configured network device is included in the static neighbor list of the static neighbor configured network device; and accepting the unicast packet if the dynamically configured network device is found in the neighbor list for the static neighbor configured network device.

8. A method for operating static neighbor configured network device the method comprising:

receiving a multicast packet from a dynamically configured network device in a network segment with the static neighbor configured network device;

determining if the dynamically configured network device is included in the static neighbor list of the static neighbor configured network device;

accepting the multicast packet if the dynamically configured network device is found in the neighbor list for the static neighbor configured network device, wherein adjacency for the static neighbor configured network device is not lost with any other currently adjacent network devices when the multicast packet is received; and rejecting the multicast packet from the dynamically configured network device if the dynamically configured network device is not on the static neighbor list for the static neighbor configured network device, wherein adjacency for the static neighbor configured network device is not lost with any other currently adjacent network devices when the multicast packet is rejected.

9. The method of claim 8, wherein the multicast packet includes a request for forming adjacency between the dynamically configured network device and the static neighbor configured network device.

10. The method of claim 9, further comprising sending a unicast response packet to the dynamically configured network device to form adjacency with the dynamically configured network device.

11. The method of claim 10, wherein the multicast packet comprises first routing information for the dynamically configured network device and the unicast packet comprises second routing information for the static neighbor configured network device, wherein adjacency is formed using the exchanged first routing information and the second routing information.

12. The method of claim 8, wherein the multicast packet is received after forming adjacency between the dynamically configured network device and the static neighbor configured network device.

13. The method of claim 8, further comprising:

receiving a unicast packet from the dynamically configured network device;

determining if the dynamically configured network device is included in the static neighbor list of the static neighbor configured network device; and accepting the unicast packet if the dynamically configured network device is found in the neighbor list for the static neighbor configured network device.

14. A dynamically configured network device configured to dynamically form adjacency with network devices without using a static neighbor list, wherein the dynamically configured network device comprises one or more processors and a memory containing instructions that, when executed by the one or more processors, cause the one or more processors to perform a set of steps comprising:

sending a multicast packet, wherein the multicast packet is received at the static neighbor configured network device in a network segment with the dynamically configured network device; and receiving a unicast response packet from the static neighbor configured network device in response to the multicast packet, wherein the dynamically configured network device and the static neighbor configured network device are adjacent to each other or can form adjacency, wherein adjacency for the static neighbor configured network device is not lost when the multicast packet is received at the static neighbor configured network device.

15. The dynamically configured network device of claim 14, wherein the static neighbor configured network device includes a static neighbor list that has the dynamically configured network device on it.

16. The dynamically configured network device of claim 14, wherein the multicast packet includes a request for forming adjacency between the dynamically configured network device and the static neighbor configured network device.

17. The dynamically configured network device of claim 16, wherein the unicast packet received at the dynamically configured network device is a response to form adjacency with the dynamically configured network device.

18. The dynamically configured network device of claim 17, wherein the multicast packet comprises first routing information for the dynamically configured network device and the unicast packet comprises second routing information for the static neighbor configured network device, further comprising forming adjacency using the exchanged first routing information and the second routing information.

19. The dynamically configured network device of claim 14, further comprising sending the multicast packet after forming adjacency between the dynamically configured network device and the static neighbor configured network device.

20. The dynamically configured network device of claim 14, wherein the static neighbor configured network device is configured to reject the multicast packet from the dynamically configured network device if the dynamically configured network device is not on the static neighbor list for the static neighbor configured network device, wherein adjacency for the static neighbor configured network device is not lost with any other currently adjacent network devices when the multicast packet is rejected.

21. The dynamically configured network device of claim 14, wherein the dynamically configured network device is configured to send a unicast packet, wherein the static neighbor configured network device is configured to determine if the dynamically configured network device is included in the static neighbor list of the static neighbor configured network device; and is configured to accept the unicast packet if the dynamically configured network device is found in the neighbor list for the static neighbor configured network device.

22. A static neighbor configured network device configured with a static neighbor feature, the static neighbor configured network device comprising:

means for receiving a multicast packet from a dynamically configured network device in a network segment with the static neighbor configured network device;

means for determining if the dynamically configured network device is included in the static neighbor list of the static neighbor configured network device;

means for accepting the multicast packet if the dynamically configured network device is found in the neighbor list for the static neighbor configured network device, wherein adjacency for the static neighbor configured network device is not lost with any other currently adjacent network devices when the multicast packet is received; and means for rejecting the multicast packet from the dynamically configured network device if the dynamically configured network device is not the static neighbor list for the static neighbor configured network device, wherein adjacency for the static neighbor configured network device is not lost with any other currently adjacent network devices when the multicast packet is rejected.

* * * * *